Patented Jan. 4, 1944

2,338,184

UNITED STATES PATENT OFFICE 2,338,184

COCONUT PRODUCT

Charles W. Kaufman, Hasbrouck Heights, N. J., assignor to General Foods Corporation, New York, N. Y., a corporation of Delaware No Drawing. Application January 17, 1941, Serial No. 374,946

5 Claims. (Cl. 99—125)

This invention relates to coconut and particularly to prepared or packaged coconut of the character used for bakery, confectionery, and household purposes.

Fresh coconut shreds being as high as 40% in moisture content do not constitute a practical commercial product. Accordingly, shredded coconut is usually marketed in the form of shreds which are either thoroughly dried to about 2% moisture, dried to about 5% moisture and treated with sugar, salt, and glycerine, or similarly treated and dried to about 15% moisture and pasteurized in sealed cans. Due to the difference in moisture content of these types of coconut, their palatability and tenderness vary greatly. The thoroughly dried shreds are hard, brittle, and lacking in flavor and not suitable for ordinary purposes without some treatment to render them sweet and tender, whereas the method of packing the coconut in sealed cans is expensive and is suitable only for a select trade. The third method of drying the coconut to about 5% moisture and adding sugar and glycerine has the advantage of not requiring pasteurization or sealed containers and is, therefore, less expensive and more suitable for the general market. However, due to its low moisture content this product even when first prepared is less palatable than canned coconut. It also has the disadvantage that this low moisture level is more or less critical. A reduction such as usually occurs during shelf storage causes the product to become tough and brittle, while a slight increase permits mold formation and other spoilage to occur. In fact this spoilage occurs so rapidly that shredded coconut used to decorate the icing on bakers' cakes marketed in Cellophane wrappers may, and often does, mold before the cakes can be sold, because the coconut takes up moisture from the cake and becomes an excellent media for mold growth.

Experience has shown that within reasonable limits the greater the moisture content, the more tender the coconut. Accordingly shredded coconut of the type now marketed with about 5% moisture would be greatly improved if its moisture content were higher. The problem, however, is complicated by the difficulties of keeping the product sterile and sweet and of good color and flavor at the higher moisture levels. Up to the present no satisfactory solution to this problem has been presented and accordingly the bulk of prepared coconut marketed today is still of the 5% moisture type.

One of the objects of the present invention is to provide a coconut product having a moisture content, tenderness, flavor, and color approximating those of canned coconut and a resistance to mold growth and deterioration sufficient to permit its marketing in bulk or in low-cost containers for purposes of ordinary commercial distribution.

Another object is to provide an improved type of coconut product which has not been commercially available heretofore.

A further object is to provide a coconut product containing an ingredient having humectant properties combined with mold inhibiting properties sufficient to maintain the product sweet and sterile at moisture levels as high as 15% in low-cost paper-board cartons.

Generally stated, the present invention comprises the addition to coconut of a suitable amount of an edible glycol, specifically propylene or butylene glycol. I have found that the use of these substances makes it possible to market coconut containing as high as 15% moisture in the same manner as the 5% moisture type of coconut has been marketed heretofore, and also that coconut to which these substances have been added, even in the presence of greatly increased moisture, can be kept for substantially longer periods of time than the present 5% moisture coconut without danger of spoilage. In the concentrations desirable for commercial purposes, propylene and butylene glycol have substantially no effect on the flavor or color of the coconut and possess excellent plasticizing and humectant properties. Moreover, the high moisture level made possible by the use of these substances imparts to the coconut a tenderness, palatability, and texture far superior to the 5% moisture product to which the public has become accustomed.

The improved results referred to above can be obtained with a content of either propylene or butylene glycol that is substantially less than the glycerine content of the present commercial 5% moisture product. In fact, I have found that propylene glycol, for example, has the same plasticizing and humectant properties as twice as much glycerine and at the same time makes possible a moisture content of 14%–15% or three times that of the present commonly marketed product with a correspondingly greater tenderness and palatability and without danger of spoilage during the period of marketing. Accordingly, it is possible in practice to market a product containing as high as 15% moisture with as little as 2% of either propylene or butylene glycol. Of course, the content of propylene or butylene glycol may be increased if desired but I find that when either is used in amounts approaching 5%, the coconut is rendered too sweet for ordinary purposes. In other cases, it may be desirable to use amounts of propylene or butylene glycol substantially less than 2%.

In testing the efficacy of propylene and butylene glycol for the above purposes, comparative samples of coconut of varying moisture content were prepared with these two ingredients and glycerine as humectants and compared for flavor, color, tenderness, moisture retention, and fungistatic properties. No undesirable effects on flavor or color were observed in the propylene and butylene samples. The tenderness of the different samples varied in substantially direct relation to their moisture content and the propylene and butylene samples, even at moisture levels as high as 14% and with correspondingly greater tenderness, kept without spoilage throughout the ninety-day period of the test. In contrast, coconut prepared with glycerine in the customary manner but having a moisture level approximating that of the propylene and butylene samples spoiled in as few as ten days.

The results stated generally above are shown in greater detail by the following comparative tests of lettered samples having the formulae set forth below:

TABLE 1

*Details of formulae*

| Material | A (Propylene) | B (Glycerine) | C (Glycerine) | D (Butylene) | E (Glycerine) |
|---|---|---|---|---|---|
| | Per cent | Per cent | Per cent | Per cent | Per cent |
| Coconut | 62.5 | 61.6 | 64.5 | 63.0 | 62.2 |
| Sugar | 26.0 | 25.9 | 27.0 | 26.5 | 26.3 |
| Salt | 0.5 | 0.5 | 0.5 | 0.5 | 0.5 |
| Humectant | 2.0 | 3.0 | 3.0 | 2.0 | 3.0 |
| Water | 9.0 | 9.0 | 5.0 | 8.0 | 8.0 |

The materials of the above samples, of which sample C represents the commercial 5% moisture product, were mixed with an excess of water in such a way that the coconut shreds were coated uniformly with the sugar, salt, and humectant. After mixing, the samples were dried in a circulating air dryer to the indicated moisture contents.

The tenderness of these samples was measured on the basis of their relative compressibility and the scores given in the following table are expressed with relation to a figure of 100 representing the tenderness score of pasteurized canned coconut. To simulate market conditions tenderness was determined both at the time of preparation of the samples and after three weeks of storage in sealed glassine bags held at 85° F. in a dry atmosphere.

TABLE 2

*Tenderness scores*

| | When prepared | | After three weeks dry storage | | |
|---|---|---|---|---|---|
| | Moisture | Tenderness score | Moisture | Moisture retained | Tenderness score |
| | Per cent | | Per cent | Per cent | |
| A | 8.8 | 88.8 | 6.3 | 71.6 | 77.4 |
| B | 9.2 | 89.8 | 6.3 | 68.4 | 74.2 |
| C | 5.4 | 53.0 | 3.1 | 57.4 | (1) |
| D | 8.0 | 81.0 | 5.2 | 65.0 | 56.0 |
| E | 8.0 | 78.0 | 5.5 | 68.7 | 57.0 |

[1] Dry and brittle.

To test the hygroscopicity and resistance to mold growth of the above samples, freshly prepared lots of each were inoculated with mold spores and incubated at 85° F. in a 100% humidity atmosphere for three weeks. The results of this test are shown in the following table in connection with which it should be noted that the mold growth in the case of samples A and D occurred only in small isolated fields rather than throughout the mass as in the other samples indicating that localized condensed moisture may have removed or effectively diluted the humectant in these fields.

TABLE 3

*Moisture absorption and mold inhibition at 100% humidity*

| Sample | Moisture by weight absorbed after 17 days storage | Cubic inches of moldy coconut after 21 days storage |
|---|---|---|
| | Percent | |
| A | 20.8 | 0.71 |
| B | 19.2 | 3.65 |
| C | 20.8 | 3.65 |
| D | 20.2 | 1.22 |
| E | 21.2 | 3.02 |

To demonstrate the superior fungistatic property of products embodying the invention at various moisture levels, a series of specimens corresponding to samples A, D, and E but with gradually increasing moisture content were inoculated with mold spores, placed in sealed jars, and stored at 85° F. This procedure permitted migration of moisture within the mass which in the case of barrels or other bulk packages of the present commercial 5% moisture product has resulted in localized areas of higher than average moisture and concomitant spoilage. The results of these tests, in terms of the period of merchantable life of the samples before spoilage, are shown in the following table:

TABLE 4

*Merchantable life in days*

| Sample | Moisture level | | | |
|---|---|---|---|---|
| | 8% | 10% | 12% | 14% |
| A | (1) | (1) | (1) | (1) |
| D | (1) | (1) | (1) | (1) |
| E | 26 | 20 | 16 | 10 |

[1] Still good after 90 days.

From the foregoing it will be evident that the present invention provides for the first time a coconut product having as high as 15% moisture and correspondingly improved tenderness and texture which can be marketed without spoilage in the same manner as the present commercial 5% moisture product. Although the above examples involve the use of either propylene or butylene glycol as the sole humectant, it will be understood that their use with each other or with glycerine or other suitable humectants is within the scope of the present invention. Moreover, the humectants of the present invention may also be used in combination with appropriate mold inhibitors such as lactic acid or the like or with emulsifying agents as for example glycerol monostearin. Other changes in the formulae and proportions given above will readily suggest themselves to those skilled in the art, and reference accordingly should be had to the appended claims for a definition of the limits of the invention.

What is claimed is:

1. An edible coconut product containing from 5% to 15% moisture and not more than 5% of a humectant selected from the group consisting of propylene glycol and butylene glycol.

2. An edible, mold-resistant coconut product containing 5% to 15% moisture and a humectant selected from the group consisting of propylene glycol and butylene glycol.

3. An edible coconut product containing 8% to 15% moisture and approximately 2% of a humectant selected from the group consisting of propylene glycol and butylene glycol.

4. An edible coconut product containing 8% to 15% moisture and approximately 2% propylene glycol.

5. An edible coconut product containing 8% to 15% moisture and approximately 2% butylene glycol.

CHARLES W. KAUFMAN.